(12) United States Patent
Yen et al.

(10) Patent No.: US 8,338,506 B2
(45) Date of Patent: Dec. 25, 2012

(54) METHOD FOR PRODUCING IMPROVED RUBBERIZED CONCRETE USING WASTE RUBBER TIRES

(75) Inventors: Kuo-Ji Yen, Taipei (TW); Maw-Tien Lee, Chia-Yi (TW); Liang-Hsign Chou, Chia-Yi (TW); Jen-Ray Chang, Minhsiung Township (TW)

(73) Assignee: Chun Well Industry Co., Ltd., Taipei (TW)

( * ) Notice: Subject to any disclaimer, the term of this patent is extended or adjusted under 35 U.S.C. 154(b) by 11 days.

(21) Appl. No.: 13/078,913

(22) Filed: Apr. 1, 2011

(65) Prior Publication Data
US 2012/0252910 A1 Oct. 4, 2012

(51) Int. Cl.
C04B 28/04 (2006.01)
C08K 3/00 (2006.01)
(52) U.S. Cl. ............ 524/8; 106/705; 106/706; 106/708; 106/709; 524/17; 524/35; 524/76
(58) Field of Classification Search .................. 106/705, 106/706, 708, 709; 524/8, 17, 35, 76
See application file for complete search history.

(56) References Cited

U.S. PATENT DOCUMENTS

| | | | |
|---|---|---|---|
| 3,272,761 | A | 9/1966 | Glenn |
| 4,460,720 | A | 7/1984 | Gaidis et al. |
| 5,456,751 | A | 10/1995 | Zandi et al. |
| 5,624,491 | A | 4/1997 | Liskowitz et al. |
| 5,762,702 | A | 6/1998 | Guy |
| 5,849,818 | A * | 12/1998 | Walles et al. ............ 524/8 |
| 6,387,171 | B1 | 5/2002 | Taylor et al. |
| 6,942,726 | B2 | 9/2005 | Cook et al. |
| 7,820,094 | B2 | 10/2010 | Ladely |
| 2005/0096412 | A1 | 5/2005 | Petr |
| 2007/0249762 | A1* | 10/2007 | Sylvester ............ 524/71 |
| 2009/0203807 | A1 | 8/2009 | Hough |

FOREIGN PATENT DOCUMENTS

| | | |
|---|---|---|
| DE | 19731840 A1 | 1/1999 |
| GB | 2437280 A | 10/2007 |
| WO | 2006/056072 A1 | 6/2006 |

OTHER PUBLICATIONS

Segre, N.; Joekes,I., Use of tire rubber particles as addition to cement paste, Cement and Concrete Research 2000. 30 (9) 1421-1425.
Chou, L.H.:Lu, C.K.:Chang, J.R.; Lee, M.T., Use of waste rubber as concrete additive, Waste Manage Res 2007, 25 (1) 68-76.
Chou,L.H ; Yang,C.K.;Lee, M.T.;Shu, C.C, Effects of Partial Oxidation of Crumb Rubber on Properties of Rubberized Mortar, Composities: Part B Sep. 2010.
Chou, L.H., Mortars with Partially Oxidized Waste Rubber Crumbs. Advanced Material Research vol. 156-157 (2011) pp. 1421-1424.
Plank, J.;Hirsch, C., Impact of Zeta Potential of Early Cement Hydration Phases on Superplasticizer Adsorption, Cement and Concrete Research, 2007, 37 (4) 537-542.
PCT/US2012/030048 Search Report Dated Aug. 13, 2012.
Chou et al, "Effects of Partial Oxidation of Crumb Rubber on Properties of Rubberized Mortar" Composites: Part B Engineering, vol. 41, No. 8, 2010, pp. 613-616 ISSN: 1359-8368 DOI: 10.1016/J.CompositesB. 2010.09.009.

* cited by examiner

Primary Examiner — Terressa Boykin
(74) Attorney, Agent, or Firm — Cascio & Zervas

(57) ABSTRACT

Partial oxidation of crumb rubber derived from environmental hazardous waste tires yields surface treated crumb rubber and a gas condensate which are used as blending stocks for making rubberized concrete with substantially improved mechanical strength as compared to the conventional rubberized concrete. The chemically more active rubber surface becomes hydrophilic, so it interacts with the hydrophilic surface of surrounding cement matrix much stronger. The gas condensate co-produced in the partial oxidation reactor consists of mainly active sulfur oxides ($R$—$SO_x$—$R$) and serves as an excellent bonding agent to further enhance the bonding strength between the partially oxidized rubber particles and the cement mixes. The mechanically improved rubberized concrete is more versatile than conventional rubberized concrete.

33 Claims, 6 Drawing Sheets

METHOD FOR PRODUCING IMPROVED RUBBERIZED CONCRETE USING WASTE RUBBER TIRES

FIELD OF THE INVENTION

The present invention relates generally to rubberized concrete that is made from waste rubber tires. Crumb rubber is partially oxidized in a surface treatment technique whereby the hydrophobic rubber surface is transformed into a hydrophilic surface. The oxidation process concomitantly co-produces a gas condensate, consisting mainly of active sulfur oxides, which serves as a bonding agent between the hydrophilic, partially oxidized rubber and the hydrophilic cement mixes. Rubberized concrete made with the treated crumb rubber and bonding agent exhibit substantially improved mechanical characteristics as compared to conventional rubberized concrete.

BACKGROUND OF THE INVENTION

The disposal of waste rubber tires is major concern throughout the world. The U.S. alone adds approximately 270 million waste tires (3.6 million tons) annually to the several billions that already overflow landfills and causes environmental and health hazards. Many jurisdictions impose license fees or special taxes to defray the costs associated with tire disposal.

Recycling waste tire in the form of the crumb rubber in concrete has been developed as a cost effective solution to this problem. Rubberized concrete, which is less dense but more ductile than conventional concrete, is tough and impact resistance and is used, for instance, in noise barriers, heat insulation, and vibration dampening. Unfortunately, as crumb rubber replaces some of the aggregate in concrete, the compressive strength and splitting tensile strength of the resulting rubberized concrete are reduced proportionally. This severely limits the amount of crumb rubber that can be incorporated and curtails the range of rubberized concrete's applications. U.S. Pat. No. 5,456,751 to Zandi et al. discloses concrete compositions containing 0.05 to 20 percent by weight particulate rubber that are derived from recycled waste tires. The addition of rubber reduces the compressive strength of the concrete from 4,000 psi to 1,900 psi. This reduction occurs even in the presence of a "superplasticizer" that enhances the adhesion of tire rubber particles to the cement paste, which has been a major problem of rubberized concrete. U.S. Pat. No. 5,762,702 to Guy describes a rubberized concrete composition containing about 3.5 to 4.0 percent by weight shredded particulates comprising rubber, fibers and steel, that are obtained from whole waste tires, fly ash additives and a superplasticizer. Test cylinders made from the concrete composite exhibit a compressive strength of 4,000 psi at 7 days. The patent however provides no test data.

U.S. Patent Application 20050096412 to Petr et al. describes concrete compositions containing rubber aggregates, having distinct geometric shapes, along with superplasticizers, fly ash, carbon fiber, fiberglass, and steel that are mixed with the concrete compositions to vary properties of the finish products. The compressive strength of the rubberized concrete is lower than that of conventional concrete.

The primary reason for the lowered compressive and tensile strengths of rubberized concrete is that the crumb rubber particulates form relatively weak physical bonds with the concrete matrix. Superplasticizers appear to enhance the physical bonding between the hydrophobic rubber particulates and the hydrophilic concrete matrix that results in a moderately stronger rubberized concrete composite moderately.

Various surface techniques have been developed to promote stronger bonding between the rubber particles and the surrounding cement matrix. These techniques require, for instance, washing rubber particles with water, modifying the rubber surface with acid etching or plasma treatment, and employing coupling agents. Sodium hydroxide (NaOH) treatment appears to achieve the best results in enhancing the adhesion of tire rubber particles to the cement paste although the resulting rubberized concrete still show a 33 percent reduction in compression strength as compared to the conventional concrete. See, Segre, N. and Joekes, I., "Use of tire rubber particles as addition to cement paste", *Cement and Concrete Research* 2000, 30 (9), 1421-1425.

Chou et al. proposed a theoretical analysis to explain the effect of rubber additives on mechanical properties of the rubberized concrete and showed that the addition of rubber particles could block water diffcusion in rubberized concrete, leading to insufficient and imperfect hydration in some regions, even when the rubber particulates are chemically pretreated with sodium hydroxide. The reduced adhesion at the interfacial surface between cement and rubber grains is a critical factor for the reduction of the compressive strength in rubberized concrete. See, Chou, L. H.; Lu, C. K.; Chang, J. R.; Lee, M. T., "Use of waste rubber as concrete additive", *Waste Manage Res* 2007, 25 (1), 68-76.

The art is in need of improved techniques for modifying the surface properties of rubber particles in order to enhance the adhesion between the particles and surrounding cement matrix and to manufacture stronger rubberized concrete.

SUMMARY OF THE INVENTION

The present invention is based in part on the demonstration that subjecting crumb rubber to partial surface oxidation renders the surface hydrophilic. The so-modified rubber surface interacts strongly with the hydrophilic surface of surrounding cement matrix. Partial oxidation also transforms some of the rubber material containing sulfide functional groups (—S—) into a gas condensate where much of the sulfide functional groups have been converted primarily into active sulfones (R—$SO_2$—R), sulfoxides (R—SO—R), and sulfur trioxides (R—$SO_3$). The gas condensate was found to be an excellent bonding agent that facilitates the bonding between the partially oxidized rubber particles and the cement mixes. The gas condensate serves as a bonding agent between the modified rubber and cement in a fashion analogous to that of commercial superplasticizers. The partially oxidized rubber particles along with the co-produced gas condensate can be mixed with cement mixes to produce rubberized concrete with substantially improved mechanical properties. The improved rubberized concrete is more versatile and can be employed in applications that are not suitable for conventional rubberized concrete.

In one aspect, the invention is directed to a concrete composition that includes cement and crumb rubber particles that are partially oxidized and have sulfur-containing, hydrophilic moieties comprising reactive functional groups. These moieties are preferably reactive to hydrophilic moieties present in cement matrix and comprise, for instance, sulfoxides (R—SO—R), sulfones (R—$SO_2$—R) and/or sulfur trioxides (R—$SO_3$). The concrete composition preferably also includes a liquid bonding agent that contains a functional group that is selected from the group consisting of sulfoxides, sulfones, sulfur trioxides and mixtures thereof.

In another aspect, the invention is directed to a concrete composition that includes (i) cement, (ii) rubber particles that are partially oxidized and have surface active functional groups that are selected from the group consisting of sulfoxides (R—SO—R), sulfones (R—SO$_2$—R), sulfur trioxides (R—SO$_3$) and mixtures thereof, and (iii) a bonding agent that is gas condensate that is formed by partially oxidizing crumb rubber in the presence of oxygen gas.

In yet another aspect, the invention is directed to a method of producing partially oxidized rubber particles and binding agents, which are suitable for use as concrete components, that includes the step of heating rubber particles in the presence of oxygen to partially oxidize the rubber particles such that the surface of the particles form hydrophilic moieties comprising functional groups that are selected from the group consisting of the sulfoxides (R—SO—R), sulfones (R—SO$_2$—R), sulfur trioxides (R—SO$_3$) and mixtures thereof. Heating the rubber particles simultaneously co-produces a gas condensate that serves a binding agent between the rubber particles and the cement in concrete compositions. The effectiveness of the bonding agent is at least comparable to that of commercial superplasticizers.

DETAILED DESCRIPTION OF THE PREFERRED EMBODIMENTS

Crumb rubber particles tested were recycled from waste tires in a process that initially separates the rubber component from the steel wires, glass fibers, and other non-rubber materials; subsequently, debris-free rubber is recovered by cryogenic freezing with liquid nitrogen or other suitable means. The rubber then is mechanically grounded and screened into irregular-shaped particles of the desired size that typically ranges from 100-1,000 μm and preferably from 300-600 μm. The crumb rubber comprises natural rubber, styrene-butadiene rubber, butadiene rubber, butyl rubber, and/or isoprene rubber. These polymers are cross-linked by organic sulfur compounds that improve the durability and strength of cured rubber. The cured rubber also has additives including zinc oxide, carbon black, calcium carbonate, and antioxidants.

Organic sulfur compounds, which are represented generally as: R—S—R, can be oxidized into organic sulfoxides (R—SO—R), organic sulfones (R—SO$_2$—R), and organic trioxides (R—SO$_x$) under controlled conditions and into SO$_x$ gases under combustion at high temperatures. For the crumb rubber particles, 'R' represents the hydrocarbon rubber components connected to the sulfur-containing functional groups. The sulfoxide functional group (—S=O) is more active than the sulfone group (—SO$_2$), which in turn is more active than the sulfide group (—S—). For example, dimethyl sufoxide is chemically more active than dimethyl sulfone and much more active than dimethyl sulfide. With the present invention, partial oxidation chemically alters the surface of the crumb rubber particles by converting the sulfide functional group (—S—) into sulfone group (—SO$_2$), and preferably into sulfoxide group (—S=O). In addition, at least a portion of rubber particles is converted into a gas condensate.

Figure 1:
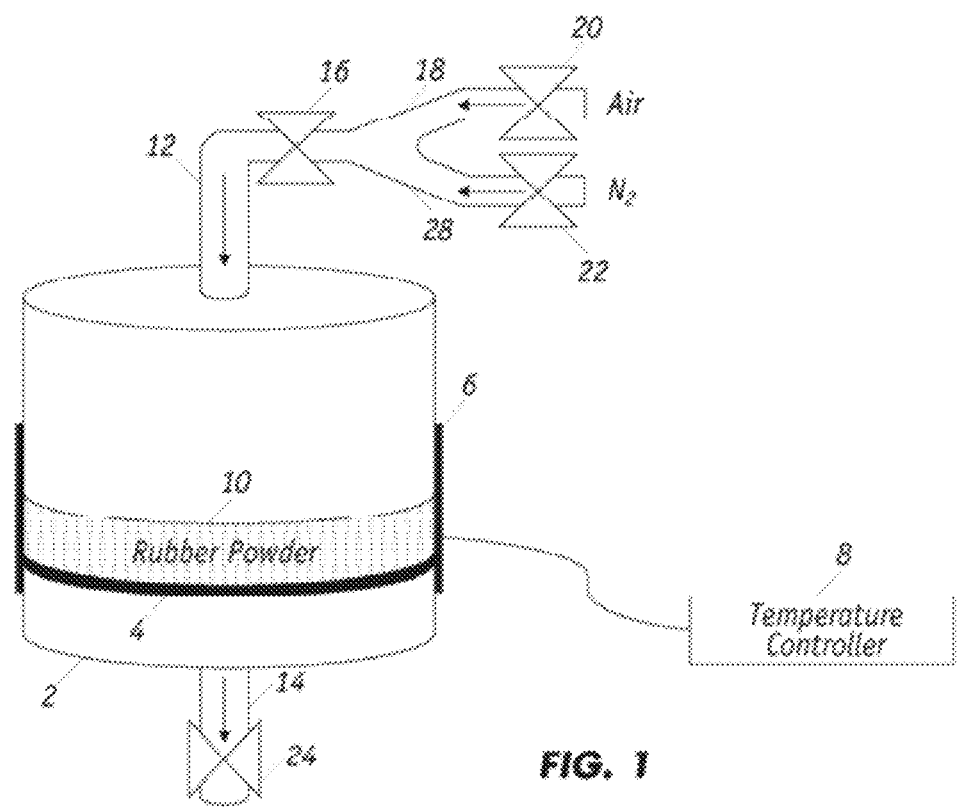
FIG. 1 is a schematic diagram of a batch partial oxidation reactor.

FIG. 1 illustrates a batch system that is configured to partially oxidize a predetermined amount of crumb rubber that is inserted into cylindrical batch reactor vessel 2 that is equipped with a meshed screen 4 to support a fixed rubber, particle bed 10 within the reaction zone. Gas inlet 12 and gas outlet 14 are located at the top and bottom of vessel 2, respectively. Gas inlet 12 is connected to a source of air 18 and oxygen 28. Valves 16, 20 and 22 regulate the flow of the air/oxygen mixture, oxygen and air, respectively. The air serves as a source of nitrogen, an inert gas, which moderates the rate of oxidation. In operation, a mixture of nitrogen and air is fed into the reactor zone and through the porous rubber particle bed at a controlled rate for a period of time sufficient for the desired air-to-nitrogen (A/N) volume ratio to be established; thereafter, valves 16 and 24 are closed. The A/N volume ratio typically ranges from 5/1 to 1/7 and preferably from 1/2 to 1/5.

The vessel is then heated with an electrical heating ring 6 that is wrapped around the vessel's exterior; a thermal couple (not shown) measures the temperature in the reaction zone and signals therefrom are communicated to a temperature controller 8 that includes an electronic relay to regulate the temperature of the heating ring 6. The vessel is heated to a desired partial oxidation temperature that typically ranges from 100 to 500° C. and preferably from 200 to 300° C. The partial oxidation reaction is conducted for a predetermined period of time that typically ranges from 30 minutes to 3 hours and preferably from 45 minutes to 2 hours before the reactor is allowed to cool to room temperature. Partially oxidized rubber particles, which have a sticky and oil appearance, are first removed from the reactor before the gas condensate is collected by rinsing the reactor with a suitable organic solvent. The gas condensate is completely soluble in acetone, so it can be used to remove the sticky condensate from the reactor. As further described herein, a part of the condensate is also soluble in water.

Using this procedure, rubber crumb was partially oxidized in a reactor configured as shown in FIG. 1 with a reaction zone approximately 8.2 cm in diameter and 19.5 cm in height. The air to nitrogen ratio was 1/4 (or an oxygen-to-nitrogen volume ratio O/N of 0.04). The reactor was heated 250° C. for one hour. The gas condensate was analyzed with Fourier transform infrared (FT-IR) spectrometry and nuclear magnetic resonance (NMR) spectroscopy. The surface functional groups of the partially oxidized rubber particle were analyzed with FT-IR spectrometry. FT-IR spectrometer used was from Shimadzu Company (model FTIR-8400) and NMR spectrometer was from Varian Company (model Varian NMR-300 MHz).

Figure 2:
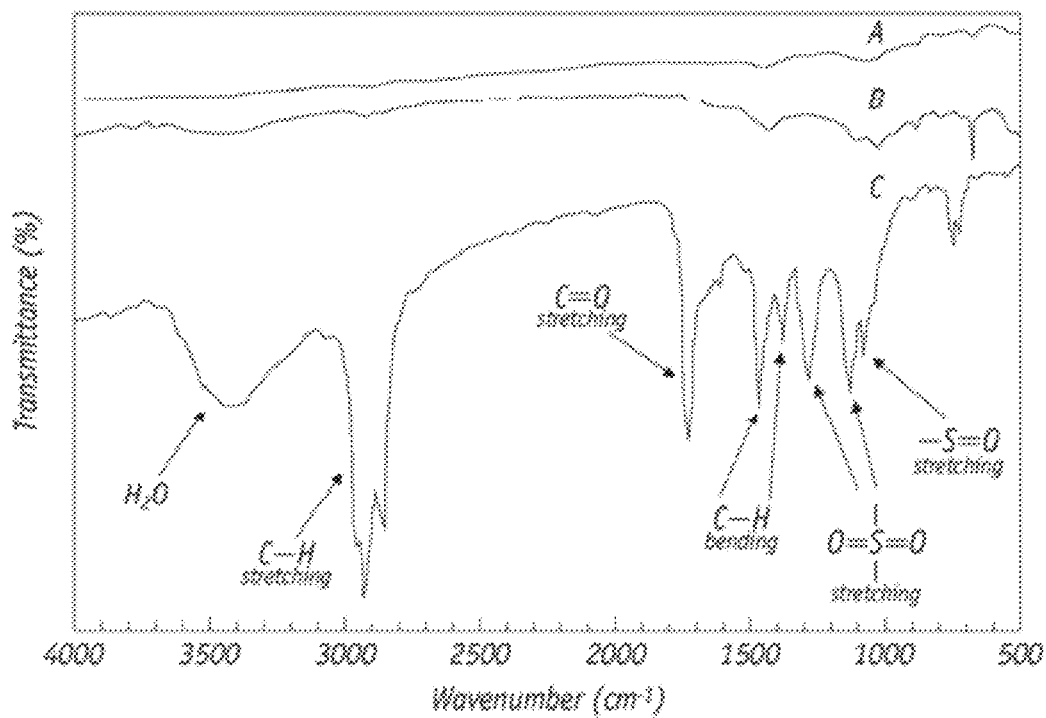
FIG. 2 shows FT-IR spectra of untreated crumb rubber (Curve A), of treated crumb rubber (Curve B), and of the gas condensate (Curve C)

FIG. 2 shows the FT-IR spectra of (i) untreated crumb rubber (Curve A), (ii) treated crumb rubber at 250° C. under A/N of 1/4 (Curve B), and (iii) the gas condensate collected from the reactor under the same treatment condition (Curve C). Curve A shows three absorptions in the vicinity of zones: 3,000 $cm^{-1}$ caused by C—H bond stretching, 1,500 $cm^{-1}$ caused by C—H bond bending, and 1,000 $cm^{-1}$ caused by S=O bond stretching. Curve B shows increases in the absorption near 1,000 $cm^{-1}$ most likely caused by the conversion of the surface sulfur molecules into the sulfoxides (R—SO—R) and/or the sulfones (R—$SO_2$—R) by the controlled partial oxidation. Surprisingly, the absorption in Curve C near 1,000 $cm^{-1}$ increases dramatically, indicating the gas condensate contains mostly the chemically active sulfoxides, sulfones, and even more active trioxides (R—$SO_3$).

The gas condensate generated from the waste tire rubber through partial oxidation can be used as a bonding agent that is equal to or better than conventional superplasticizers in terms of significantly enhancing the bonding strength between the partially oxidized rubber particles and the cement matrix. Oxidizing sulfur atoms on the rubber surface transform the hydrophobic surface into a hydrophilic one, which tends to improve its bonding with the hydrophilic surface of the cement matrix. This surface bonding is greatly enhanced by the existence of the chemically active gas condensate where the organic sulfur compounds have been oxidized into primarily sulfoxides, sulfones, and trioxides.

Figure 3:
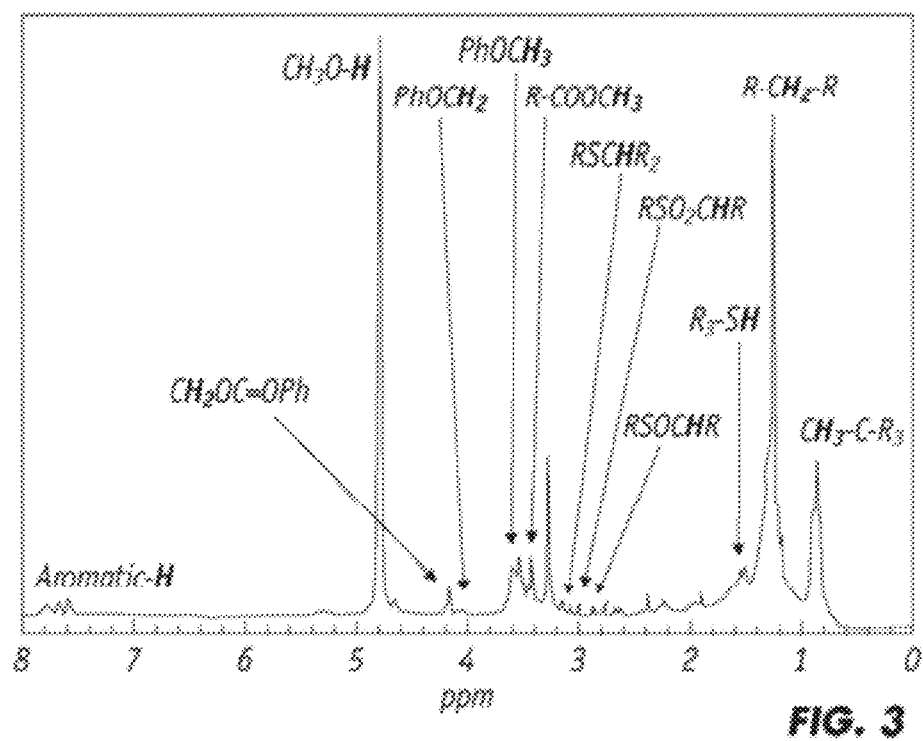
FIG. 3 shows H-NMR spectra of the gas condensate (in D-methanol solution)

The gas condensate was further investigated through H-NMR by dissolving the gas condensate sample into D-methanol and D-chloroform solvents and subjecting the solutions to NMR spectrometry analysis. FIG. 3 demonstrates that the condensate dissolved in D-methanol contained R—SO—CHR, R—$SO_2$—CHR, R—S—$CHR_2$, $R_3$—SH, and oxidized hydrocarbons. Similar H-NMR spectra were also obtained from the condensate dissolved in the solution of D-chloroform. These results indicate that controlled oxygen not only oxidizes the sulfur atoms on the rubber surface at high temperatures, but oxygen can also promote the breaking the C—S bonds of the surface sulfur atoms thereby generating active sulfoxides and sulfones in the gas condensate at higher A/N ratio and temperatures.

Figure 4:
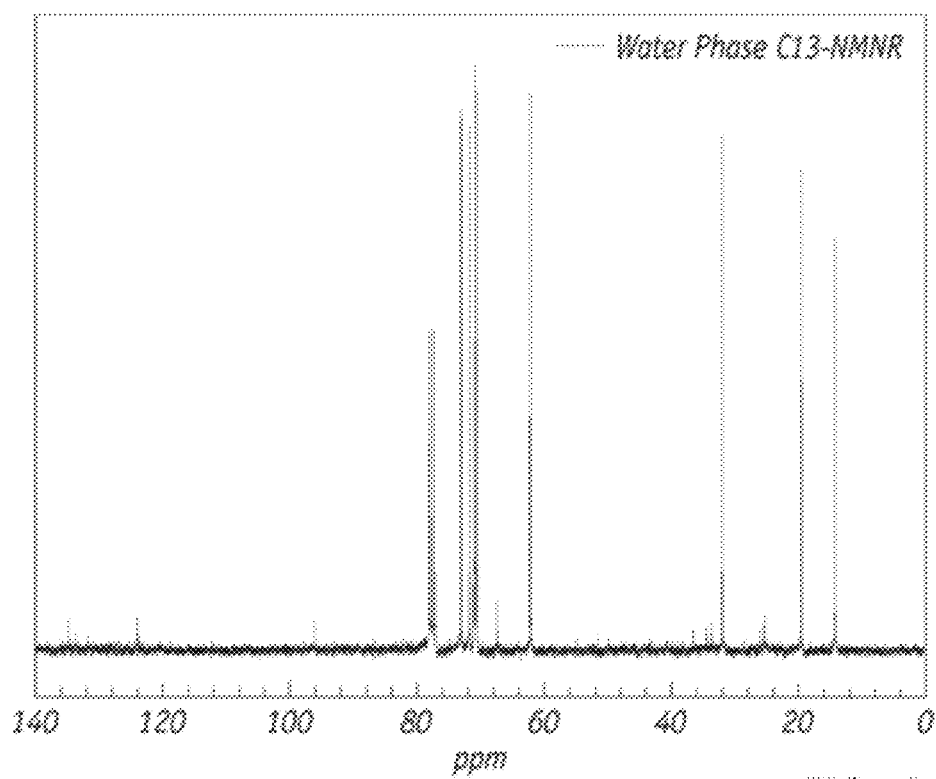
FIG. 4 shows C-NMR spectra of water-soluble species in gas condensate.
Figure 5:
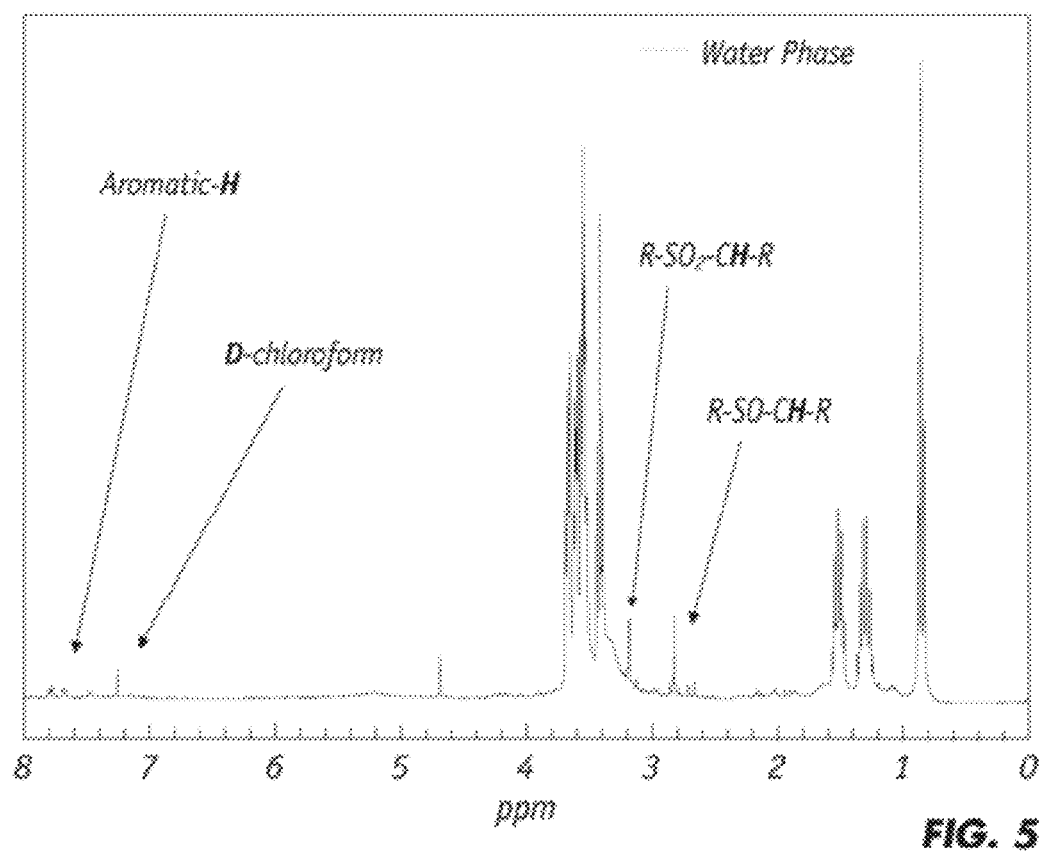
FIG. 5 shows H-NMR spectra of water-soluble species in gas condensate (in D-chloroform)

Since the principal functional groups in the gas condensate, such as sulfoxides, sulfones, sulfur trioxides, are mostly hydrophilic and water-soluble, water was used to extract these components from the gas condensate. The water phase containing these major functional groups was then analyzed by C-NMR and H-NMR and the spectra are presented in FIGS. 4 and 5, respectively. The C-NMR spectra exhibit 8 strong peaks which imply that the water phase consists of only 8 carbon compounds. It is also evident from the H-NMR spectra that the R—$SO_x$—R signal is very strong and even stronger than that of the solvent (D-chloroform) used in the analysis. Since the signal strength of R—$SO_x$—R is almost half that of R—$CH_2$—R, this suggests that a significant portion of the sulfur atoms in the gas condensate was oxidized via the controlled partial oxidation.

Figure 6:
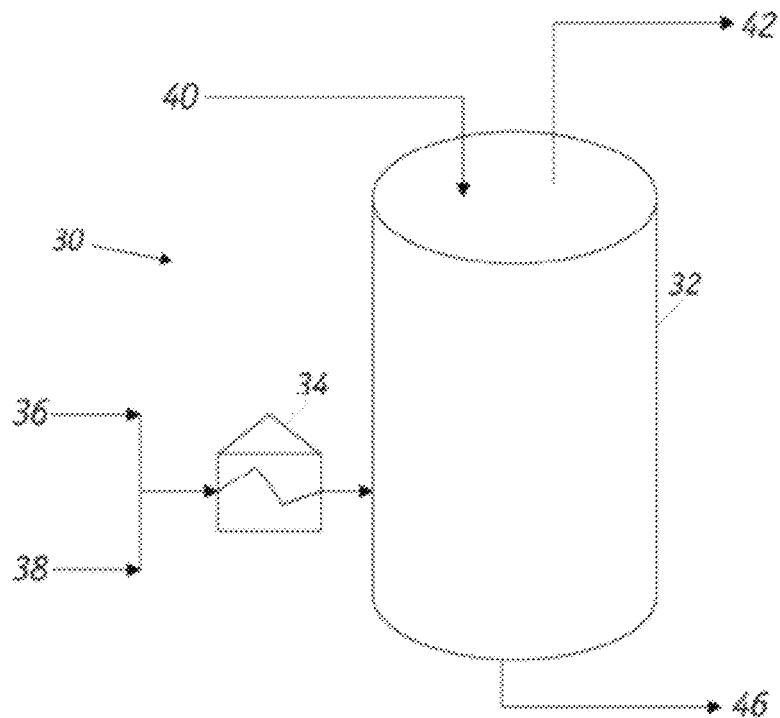
FIG. 6 is a schematic diagram of a continuous partial oxidation reactor.
Figure 7:
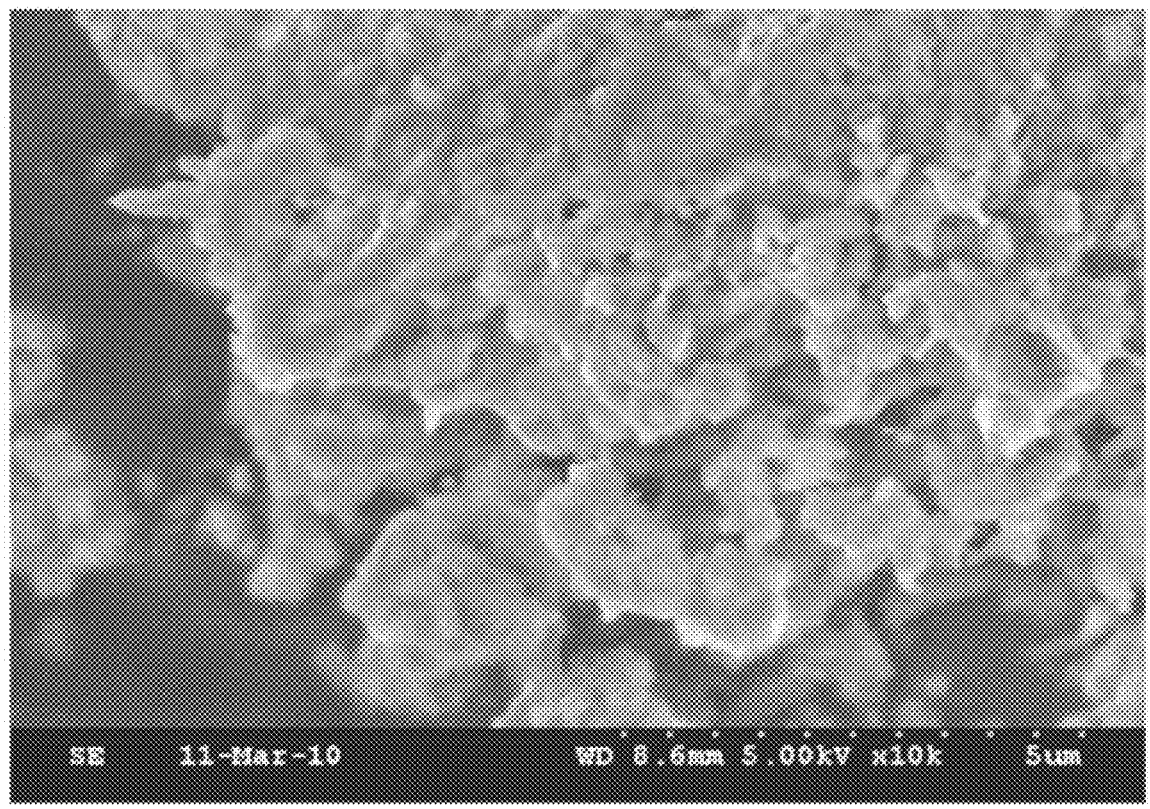
FIG. 7 is a SEM of a hydration product derived from cement and water hydration mortar.
Figure 8:
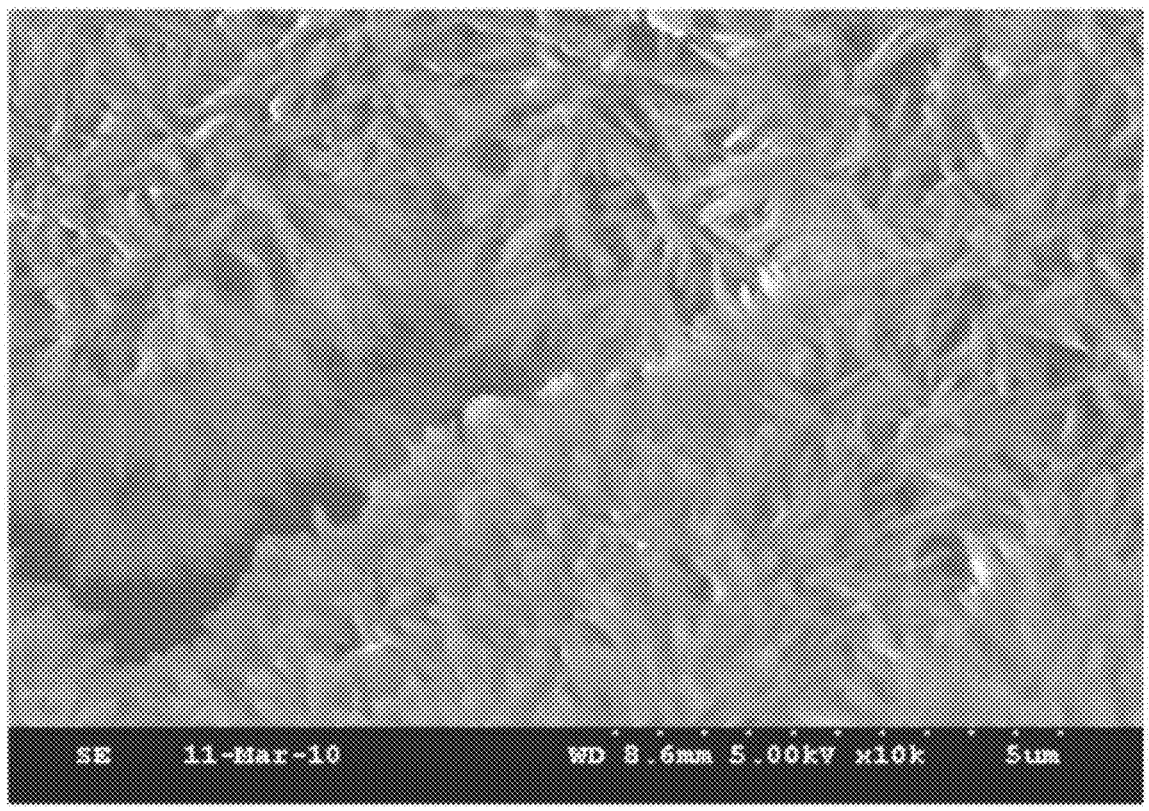
FIG. 8 is a SEM of a hydration product derived from cement and water phase gas condensate hydration mortar.
Figure 9:
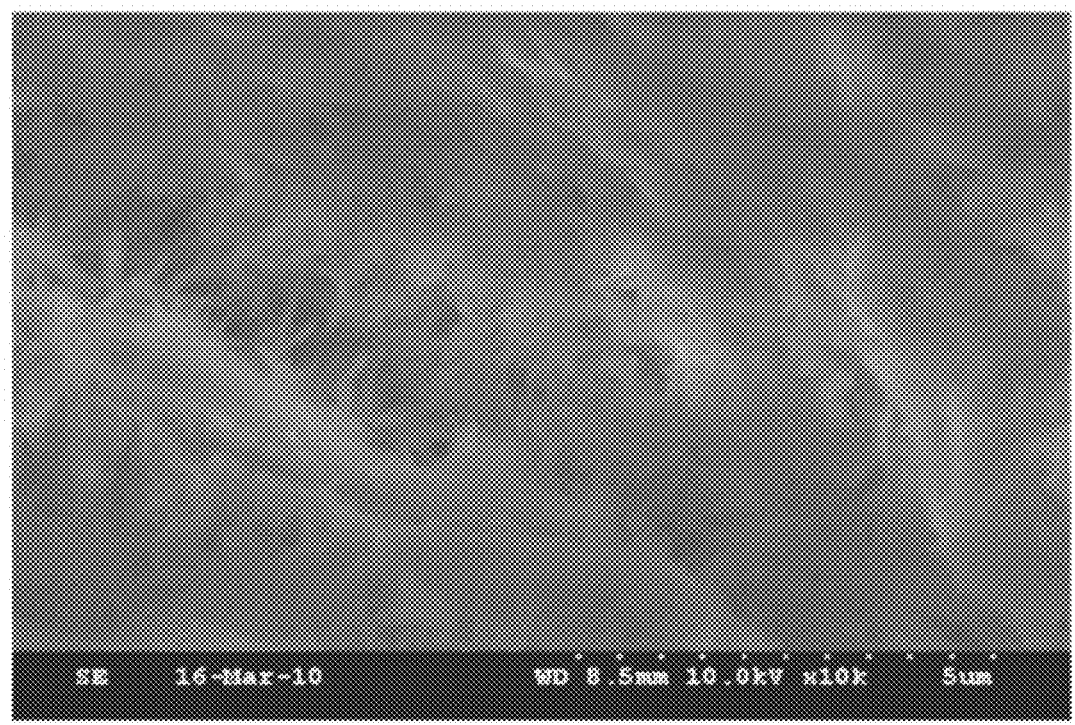
FIG. 9 is a SEM of a hydration product derived from cement and oil phase gas condensate hydration mortar.

Large scale partial oxidation of crumb rubber is preferably carried out in a continuous reactor system 30 as depicted in FIG. 6 where the operating parameters are carefully controlled in order to maximize not only the amount, as well as the activity, of the desired gas condensate. Air 36 and nitrogen gas 38 are mixed and heated in a pre-heater 34 to a predetermined temperature that is typical in the range from 100 to 500° C. and preferably from 150 to 350° C. and more preferably from 200 to 300° C. before the mixture enters the lower portion near the bottom of reactor 32. Prepared rubber particles 40 are continuously, fed through the upper portion near the top of reactor 32 at a controlled rate, so that the residence time of the rubber particles in the reaction zone is approximately from 30 minutes to 3 hours and preferably from 45 minutes to 2 hours. The rubber particles are agitated by the up-flow of air/nitrogen gas mixture as they descend and are withdrawn from the bottom of reactor 32 as treated crumb rubber 46 in a slow-moving bed fashion.

To control the reactor temperature and avoid over oxidation, the air-to-nitrogen volume ratio (A/N) is preferably maintained at a range of 5/1 to 1/7 and more preferably at a range of 1/2 to 1/5. If the A/N is too high with more than the desired oxygen level in the gas mixture, the reactor temperature will increase rapidly causing over oxidation and produce dry rubber particles with minimum or no gas condensate. Conversely, if the A/N is too low, the functional groups (R—S—R) on the rubber surface remain unaffected even with good temperature control. Partially oxidized rubber particles are preferably sticky and oily in appearance with a measurable amount gas condensate accumulating in the cooling condenser of the reactor.

With the present invention, by incorporating partially oxidized rubber particles and co-produced gas condensate into cement mixes, rubberized concrete having improved compressive strength, flexural strength, and tensile strength can be produced. Conventional concrete is a hardenable mixture comprising cementitious materials (or cement mixes), a fine aggregate such as sand, a coarse aggregate, and water. The relative proportions of the components in concrete compositions can vary depending on the desired properties of the cured product. See, for example, U.S. Pat. Nos. 5,624,491 to Liskowitiz et al. and 5,456,751 to Zandi et al, which are incorporated herein by reference.

The oxidized rubber particles will typically comprise 0.1 to 20 wt %, preferably 2 to 10 wt % and more preferably from 3.0 to 7.5 wt % of the concrete composition. When added, the liquid bonding agent (gas condensate) will typically comprise at least 0.1 wt % and preferably from 0.1 wt % to 1.0 wt % of the concrete composition.

By incorporating the oxidized rubber particles, proportionally less coarse aggregate material needs to be used. Because of the superior mechanical properties achieved with the gas condensate, no superplasticizer is required to make the rubberized concrete of the present invention. Concrete compositions made with the partially oxidized rubber particles will exhibit superior mechanical strengths. These properties are further enhanced by 25 to 50 percent with the inclusion of the bonding agent.

EXAMPLES

Crumb rubber was surface treated in accordance with the present invention and the partially oxidized rubber particles and the gas condensate were used to make rubberized concrete as described in the following samples.

Example 1

To analyze the effects of varying partial oxidation conditions, waste rubber tires were mechanically grounded and screened to 300-600 μm. The rubber crumbs were placed into a laboratory reactor as configured in FIG. 1. A mixture of air and nitrogen gas at an A/N of 1.25 was fed through the reactor for 30 minutes before sealing the reactor. Partial oxidation was carried out by raising the reactor temperature to 150° C. for a period of one hour and allowed to cool to room temperature. Partially oxidized rubber particles were removed from the reactor and gas condensate was removed with acetone. A way of avoiding over oxidation is to visually inspect the partially oxidized rubber particles to make sure they are sticky and oily in appearance. At least a measurable amount of gas condensate was collected from the reactor by rinsing with acetone. Partial oxidation was repeated on fresh crumb rubber at 200° C. and 250° C.

Example 2

Partially oxidized crumb rubber particles along with co-produced gas condensate formed at the three temperatures of Example 1 were separately collected and mixed with Portland cement to prepare specimens of rubberized cement for comparison. Portland cement from Taiwan Cement Company was used. Table 1 lists the components in the cement.

TABLE 1

| Component | Weight % | |
| | Average | Range |
| --- | --- | --- |
| CaO | 63 | 59-65 |
| SiO$_2$ | 22 | 19-25 |
| Al$_2$O$_3$ | 7 | 5-9 |
| Fe$_2$O$_3$ | 3 | 1-5 |
| MgO | 2 | 1-4 |
| SO$_3$ | 2 | 1-3 |

In preparing mortar specimens for testing, Portland cement with standard Ottawa sand (from U.S. Silica Company) was mixed with 0, 1.5, 3.0, 4.5, and 6.0 wt % of the rubber particles along with the associated gas condensate, which were partially oxidized at 150, 200, and 250° C. Specimens containing only untreated rubber particles, cement and sand were also prepared as controls. Water was added to the mixtures at a weight ratio of 0.62:1 for the hydration to prepare the concrete specimens, which were allowed to set for 3, 7, 14, 28, and 56 days before testing.

Example 3

In this example, the compressive strengths of the concrete specimens prepared in Example 2 were measured using ASTM standard method C109. The test results are summarized in Table 2.

TABLE 2

| Rubber Additive | | Concrete Compressive Strength (MPa) | | | | 56 |
| Content (wt %) | Treatment | 3 Days | 7 Days | 14 Days | 28 Days | Days |
| --- | --- | --- | --- | --- | --- | --- |
| 0 | — | 19.3 | 24.9 | 29.7 | 34.8 | 39.2 |
| 1.5 | Untreated | 14.6 | 22.1 | 23.3 | 27.4 | 28.6 |
| 1.5 | 150° C. | 12.1 | 17.1 | 21.1 | 23.5 | 28.0 |
| 1.5 | 200° C. | 12.1 | 17.1 | 21.6 | 24.2 | 28.8 |
| 1.5 | 250° C. | 20.9 | 28.9 | 32.6 | 36.9 | 40.9 |
| 3.0 | Untreated | 8.3 | 12.2 | 12.6 | 15.5 | 16.5 |
| 3.0 | 150° C. | 11.2 | 15.2 | 18.1 | 18.3 | 20.6 |
| 3.0 | 200° C. | 11.1 | 16.2 | 19.8 | 20.6 | 24.0 |
| 3.0 | 250° C. | 13.8 | 20.5 | 22.4 | 26.2 | 28.0 |
| 4.5 | Untreated | 9.5 | 10.7 | 13.1 | 15.2 | 17.4 |
| 4.5 | 150° C. | 11.4 | 12.4 | 13.4 | 15.2 | 18.0 |
| 4.5 | 200° C. | 10.6 | 13.5 | 13.5 | 16.0 | 18.1 |
| 4.5 | 250° C. | 30.0 | 40.7 | 45.1 | 45.3 | 56.3 |
| 6.0 | Untreated | 9.5 | 11.0 | 14.5 | 16.3 | 19.4 |
| 6.0 | 150° C. | 7.4 | 8.5 | 12.7 | 14.2 | 16.1 |
| 6.0 | 200° C. | 9.1 | 10.7 | 13.2 | 15.3 | 16.4 |
| 6.0 | 250° C. | 21.4 | 32.1 | 36.4 | 41.2 | 42.1 |

The data demonstrate that adding untreated rubber particles to cement mix weakens the compressive strength of the rubberized concrete in proportion to the amount of untreated rubber added. Moreover, low temperature partial oxidation, such as at 150 and 200° C., yielded treated rubber that caused little or essentially no improvement in the compressive strength of the rubberized concrete. (This does not preclude effective partial oxidation at these lower temperatures by employing different operating conditions of A/N ratio and/or reaction time.) However, rubber treated produced at 250° C. increased the compressive strength of the rubberized concrete significantly relative to ordinary concrete. For example, 56 days after hydration of the mixtures, the compressive strength of rubberized concrete containing 4.5 and 6.0 wt % treated rubber was, respectively, 56.3 and 42.1 MPa versus 39.2 MPa for ordinary concrete. This represents an improvement in compressive strength of the inventive rubberized concrete of from 40 to 225% over rubberized concrete made from untreated rubber and cement.

It is expected that inventive concrete compositions containing partially oxidized rubber and the bonding agent from the gas condensate will have a compressive strength of at least 40 MPa and preferably from 40 to 60 MPa after being cured for about 50 days or more, which is better than that of ordinary concrete.

Example 4

The flexural strengths of the concrete specimens prepared in Example 2 were measured using ASTM standard method C190 and the results are summarized in Table 3.

TABLE 3

| Rubber Additive | | Concrete Flexural Strength (MPa) | | | | 56 |
| Content (wt %) | Treatment | 3 Days | 7 Days | 14 Days | 28 Days | Days |
| --- | --- | --- | --- | --- | --- | --- |
| 0 | — | 3.8 | 5.1 | 5.7 | 6.1 | 6.4 |
| 1.5 | Untreated | 3.1 | 4.3 | 5.3 | 5.5 | 5.7 |
| 1.5 | 150° C. | 2.8 | 3.3 | 4.2 | 5.0 | 5.4 |
| 1.5 | 200° C. | 2.8 | 3.4 | 4.4 | 5.0 | 5.6 |
| 1.5 | 250° C. | 4.1 | 5.5 | 6.2 | 6.5 | 7.0 |
| 3.0 | Untreated | 2.3 | 2.7 | 3.2 | 3.7 | 3.7 |
| 3.0 | 150° C. | 2.4 | 3.0 | 3.5 | 3.9 | 4.1 |
| 3.0 | 200° C. | 2.8 | 4.3 | 4.7 | 5.1 | 5.6 |
| 3.0 | 250° C. | 2.4 | 4.0 | 4.4 | 5.0 | 5.4 |
| 4.5 | Untreated | 2.4 | 3.0 | 3.1 | 3.5 | 3.5 |
| 4.5 | 150° C. | 2.2 | 2.7 | 2.9 | 3.1 | 3.1 |
| 4.5 | 200° C. | 2.2 | 3.0 | 3.2 | 3.7 | 4.1 |
| 4.5 | 250° C. | 4.2 | 5.1 | 5.9 | 6.2 | 6.4 |
| 6.0 | Untreated | 2.4 | 3.0 | 3.2 | 3.8 | 4.2 |
| 6.0 | 150° C. | 1.8 | 2.3 | 2.8 | 3.2 | 3.9 |
| 6.0 | 200° C. | 2.1 | 2.6 | 3.0 | 3.6 | 4.1 |
| 6.0 | 250° C. | 3.9 | 5.3 | 5.8 | 6.2 | 6.6 |

The data demonstrate that adding untreated rubber to concrete mix reduces the flexural strength of the resulting concrete. The data further suggest that using low temperature treated rubber does not enhance the flexural strength of the concrete as compared to using untreated rubber. The reason may be that partial oxidation at low temperatures (50 and 200° C.) does not convert the rubber surface sulfur functional groups (R—S—R) into more active sulfoxides or sulfones (R—SO$_x$—R) and does not generate the active gas condensate bonding agent either. Finally, it is observed again that adding rubber treated at 250° C. to a concrete mix forms rubberized concrete that exhibits flexural strength that is comparable to that of ordinary concrete. This represents an improvement in flexural strength of the inventive rubberized concrete of from 20 to 90% over rubberized concrete made from untreated rubber and cement.

It is expected that inventive concrete compositions containing partially oxidized rubber and the bonding agent from the gas condensate will have a flexural strength of at least 5.4 MPa and preferably from 5.4 MPa to 6.6 MPa after being cured for about 50 days or more, which is comparable to that of ordinary concrete.

Example 5

The tensile strengths of the concrete specimens prepared in Example 2 were measured using ASTM standard method C348 and the results are presented in Table 4,

TABLE 4

| Rubber Additive | | Concrete Tensile Strength (MPa) | | | | |
|---|---|---|---|---|---|---|
| Content (wt %) | Treatment | 3 Days | 7 Days | 14 Days | 28 Days | 56 Days |
| 0 | — | 2.2 | 2.5 | 2.8 | 3.2 | 3.3 |
| 1.5 | Untreated | 1.8 | 2.1 | 2.2 | 2.4 | 2.5 |
| 1.5 | 150° C. | 1.5 | 1.7 | 2.1 | 2.3 | 2.4 |
| 1.5 | 200° C. | 1.5 | 1.7 | 2.1 | 2.3 | 2.5 |
| 1.5 | 250° C. | 2.3 | 2.7 | 3.0 | 3.4 | 3.4 |
| 3.0 | Untreated | 1.4 | 1.6 | 1.8 | 2.1 | 2.1 |
| 3.0 | 150° C. | 1.5 | 1.8 | 1.9 | 2.4 | 2.6 |
| 3.0 | 200° C. | 1.5 | 1.9 | 2.1 | 2.6 | 2.7 |
| 3.0 | 250° C. | 1.5 | 2.0 | 2.2 | 2.8 | 2.9 |
| 4.5 | Untreated | 1.3 | 1.3 | 1.6 | 1.7 | 2.1 |
| 4.5 | 150° C. | 1.3 | 1.4 | 1.5 | 1.6 | 1.8 |
| 4.5 | 200° C. | 1.2 | 1.6 | 1.9 | 1.9 | 2.1 |
| 4.5 | 250° C. | 2.1 | 2.6 | 3.4 | 3.2 | 3.1 |
| 6.0 | Untreated | 1.3 | 1.3 | 1.7 | 1.8 | 1.9 |
| 6.0 | 150° C. | 1.2 | 1.3 | 1.6 | 1.7 | 1.9 |
| 6.0 | 200° C. | 1.3 | 1.3 | 1.7 | 1.8 | 1.9 |
| 6.0 | 250° C. | 2.1 | 2.7 | 3.1 | 3.3 | 3.3 |

Again, the results clearly indicate that incorporating untreated rubber or low temperature treated rubber can significantly weaken the tensile strength of the rubberized concrete as compared to the ordinary concrete. Using treated rubber oxidized at temperature of 250° C. however produced rubberized concrete where the tensile strength is maintained at the level of the ordinary concrete.

The results from Examples 2 to 4 demonstrate that partial oxidation of the rubber particles at a higher temperature (250° C.) is preferable in order to raise the mechanical strength, including the compressive, flexural and tensile strengths, of the rubberized concrete to the level comparable to ordinary concrete or even higher. It is expected that for a batch reactor system as illustrated in FIG. 1, oxidation at a reactor temperature in the range of 200 to 250° C. will yield partially oxidized rubber and gas condensate that are suitable for incorporation into cement mixtures however the residence time in the reactor as well as the oxygen concentration of the gas feed to the reactor will need to be optimized. This represents an improvement in tensile strength of the inventive rubberized concrete of from 30 to 80% over rubberized concrete made from untreated rubber and cement.

It is expected that inventive concrete compositions containing partially oxidized rubber and the bonding agent from the gas condensate will have a tensile strength of at least 2.9 MPa and preferably from 3.1 MPa to 3.4 MPa after being cured for about 50 days or more, which is comparable to that of ordinary concrete.

Example 6

The partial oxidation described in Example 1 yielded partially oxidized rubber crumb and a gas condensate that comprised water-soluble (water phase) and water-insoluble (oil phase) components. After the gas condensate was recovered with acetone, the water-soluble components were extracted from the condensate with water. The partially oxidized rubber crumb and gas condensate components were individually mixed with Portland cement and tested. For comparison unoxidized (i.e., untreated) rubber was also tested. The five cement mixtures were tested to determine the effectiveness of the gas condensate as a bonding agent between the rubber particles and the cement matrix. The five cement mixtures consisted of the following components and mixing weight ratios:

(1) cement and water (mixing weight ratio: 1/1)
(2) cement and water phase of gas condensate (1/1)
(3) cement and water and oil phase of gas condensate (1/1/0.1)
(4) cement and water and untreated rubber (1/1/1)
(5) cement and water and partially oxidized rubber (1/1/1)

After the mixtures were prepared, each sample was allowed to undergo hydration reactions to yield five hydration products. The crystal and the surface morphology of the hydration products were observed with scanning electron microscopy (SEM) after 28 days. FIGS. 7 to 11 are the individual SEM images of the surface morphology and crystal sizes of the hydration products derived from cement in mixtures with (i) water, (ii) water phase of the gas condensate, (iii) oil phase of the gas condensate (not extracted by water), (iv) untreated rubber particles, and (v) partially oxidized rubber particles, respectively.

Figure 10:
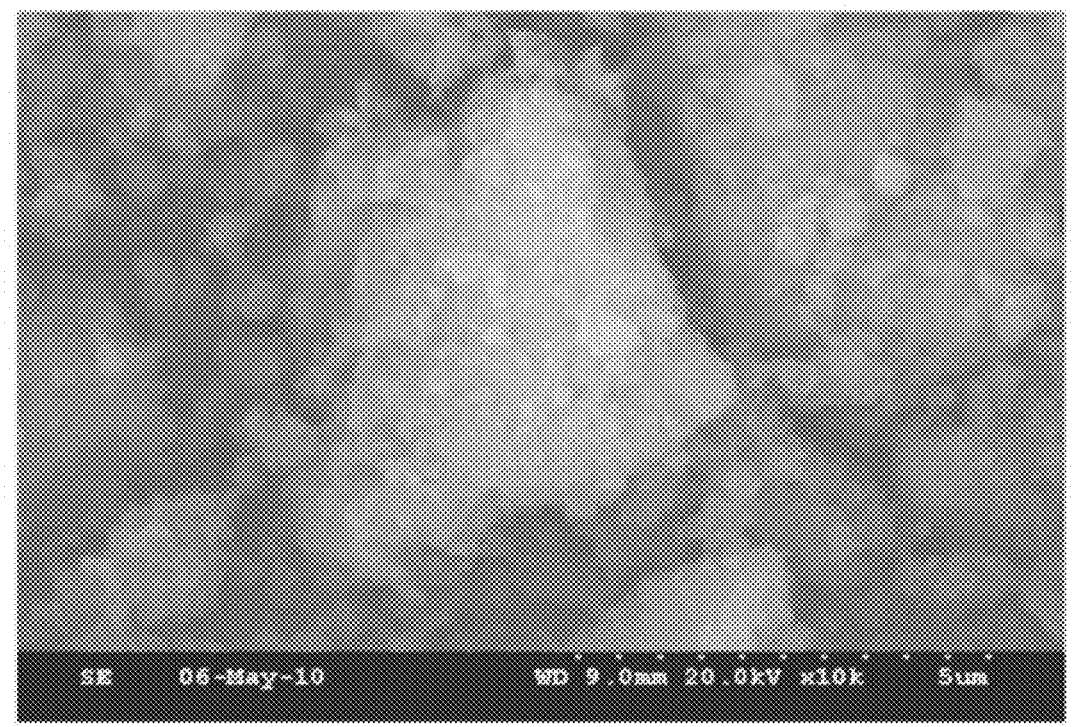
FIG. 10 is a SEM of a hydration product derived from cement and untreated crumb rubber mortar.

Comparing the SEM image of ordinary hydration product (FIG. 7) with the image of hydration product that was derived by incorporating the water phase of the gas condensate (FIG. 8) and the image of hydration product that was derived by incorporating the oil phase of the gas condensate (FIG. 9), indicates that the surface of ordinary hydration product has loose and chunky plates on the surface of the mortar, whereas the images from those made by adding the condensates consisted of fine needle crystals on a much more refined surface. This enhanced refined surface facilitates strong bonding between the partially oxidized rubber and the cement matrix. Hydration product made from cement mixed with untreated rubber (FIG. 10) and those made cement mixed with partially oxidized rubber (FIG. 11) were also compared. In FIG. 10, the surface of the hydration product exhibits spots and plates of all different sizes covering the untreated rubber surface, and the interface of untreated rubber and cement is visibly separated, which implies that the hydration crystals of cement cannot completely fit into the slots of untreated rubber, but only adsorbed physically on the rubber surface.

Figure 11:
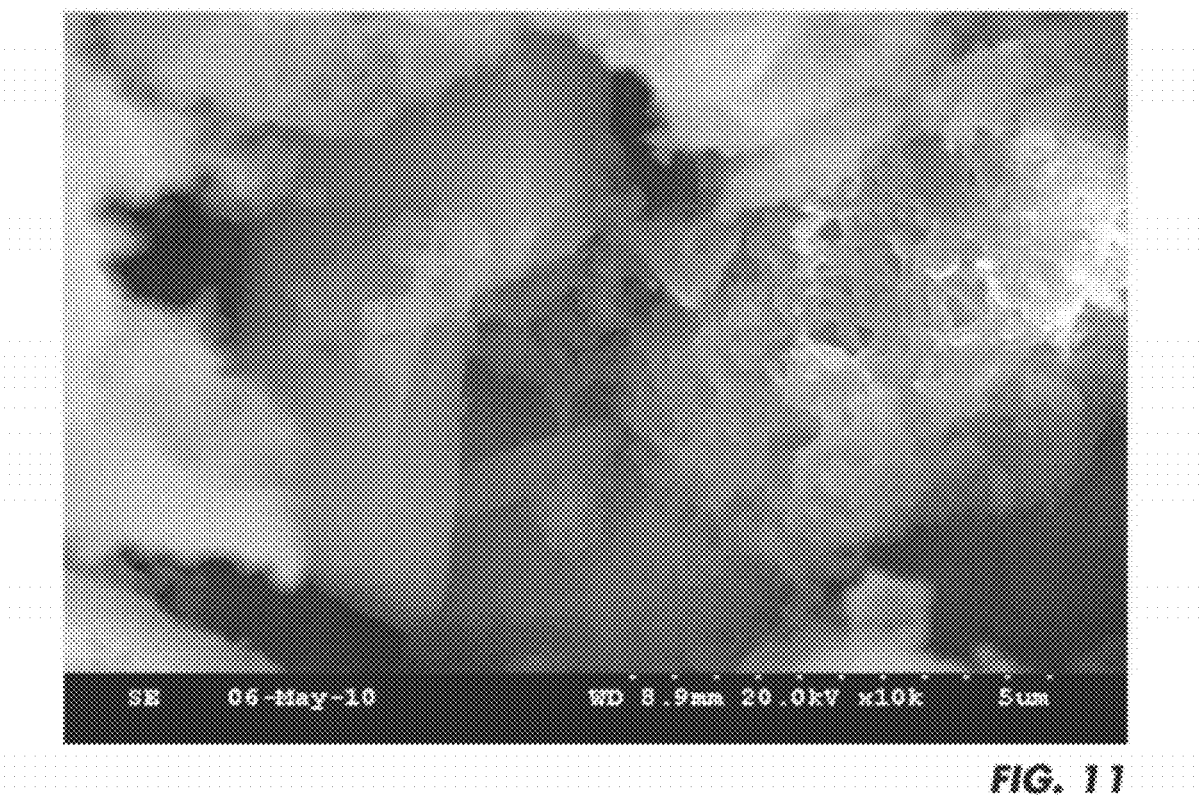
FIG. 11 is a SEM of a hydration product derived from cement and treat crumb rubber mortar.

In contrast FIG. 11 shows that the surface morphology of the hydration product derived from cement and treated rubber does have a finer needle crystalline surface and the interface of treated rubber and the cement has disappeared. The hydrophilic cement crystals are nicely fitted into the slots of the "originally" hydrophobic rubber. Partial oxidation not only converts R—S—R into R—SO$_x$—R on the rubber surface making it hydrophilic and chemically more active, so that it will bond better with the cement, but also generates the active and hydrophilic gas condensate consisting mainly R—SO$_N$—R and RSO$_3$, which tends to cover the entire surface the treated rubber as it condenses from gas phase into liquid phase, and substantially improves the bonding between the treated rubber and cement.

Example 7

Figure 12:
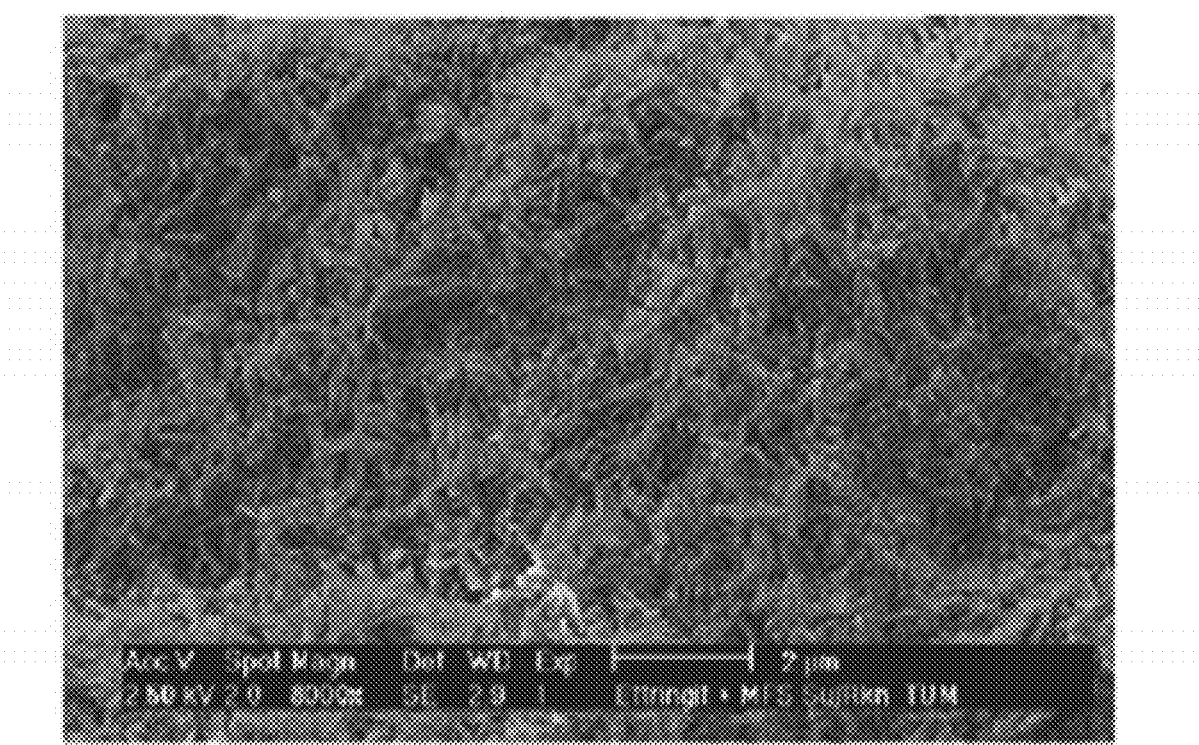
FIG. 12 is a SEM of a hydration product derived from cement and supperplasticizer (Ettringite) mortar.

This example demonstrates that the mechanism for enhancing the bonding strength between the rubber and cement by using the gas condensate of the present invention is, in fact, similar to that of employing a superplasticizer. To show the similarity, an SEM image of hydrated mortar comprising ordinary concrete and a superplasticizer, such as Ettringite revealed by Plank, et al is presented in FIG. 12. (Plank, J.; Hirsch, C.; "Impact of Zeta Potential of Early Cement Hydration Phases on Superplasticizer Adsorption", *Cement and Concrete Research*, 2007, 37 (4), 537-542). By comparing the SEM image of FIG. 8 (or FIG. 9) to that of FIG. 12, it is apparent that both the gas condensate and the superplasticizer create similar uniform fine needle crystals on the concrete surface. It is highly desirable to replace the more expensive superplasticizers with the gas condensate, which is a by-product from the partial oxidation of the rubber recovered from the waste tires for making improved rubberized concrete.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A concrete composition that comprises cement and crumb rubber particles, which comprise polymers that are cross-linked by organic sulfur compounds, that are partially oxidized and have sulfur-containing, hydrophilic reactive functional groups that are reactive to hydrophilic groups present in cement matrix and a liquid bonding agent wherein the liquid bonding agent comprises at least 0.1 wt % of the concrete composition.

2. The concrete composition of claim 1 wherein the functional groups are selected from the group consisting of sulfoxides (R—SO—R), sulfones (R—SO$_2$—R), sulfur trioxides (R—SO$_3$) and mixtures thereof, wherein R represents hydrocarbons of the rubber particles.

3. The concrete composition of claim 2 wherein the liquid bonding agent contains a functional group that is selected from the group consisting of sulfoxides, sulfones, sulfur trioxides and mixtures thereof.

4. The concrete composition of claim 1 wherein the liquid bonding agent comprises from 0.1 to 1.0 wt % of the concrete composition.

5. The concrete composition of claim 1 wherein the crumb rubber particles comprises 0.1 to 20 wt % of the concrete composition.

6. The concrete composition of claim 5 wherein the crumb rubber comprises from 3 wt % to 7.5 wt % of the concrete composition.

7. The concrete composition of claim 1 wherein the concrete composition when cured has a compressive strength of at least 40 MPa.

8. The concrete composition of claim 1 wherein the concrete composition when cured has a flexural strength of at least 5.4 MPa.

9. The concrete composition of claim 1 wherein the concrete composition when cured has a tensile strength of at least 2.9 MPa.

10. A concrete composition comprising cement, rubber particles, which comprise polymers that are cross-linked by organic sulfur compounds, that are partially oxidized such that the organic sulfur compounds on the surface of the particles are converted into surface-active functional groups that are selected from the group consisting of sulfoxides (R—SO—R), sulfones (R—SO$_2$—R), sulfur trioxides (R—SO$_3$) and mixtures thereof, and a bonding agent that is gas condensate that is formed by partially oxidizing crumb rubber in the presence of oxygen gas, wherein R represents hydrocarbons in the polymers of the rubber particles.

11. The concrete composition of claim 10 wherein the bonding agent comprises at least 0.1 wt % of the concrete composition.

12. The concrete composition of claim 11 wherein the liquid bonding agent comprises from 0.1 to 1.0 wt % of the concrete composition.

13. The concrete composition of claim 10 wherein the rubber particles comprise 0.1 to 20 wt % of the concrete composition.

14. The concrete composition of claim 13 wherein the liquid bonding agent comprises from 3 wt % to 7.5 wt % of the concrete composition.

15. The concrete composition of claim 10 wherein the concrete composition when cured has a compressive strength of at least 40 MPa.

16. The concrete composition of claim 10 wherein the concrete composition when cured has a flexural strength of at least 5.4 MPa.

17. The concrete composition of claim 10 wherein the concrete composition when cured has a tensile strength of at least 2.9 MPa.

18. The concrete composition of claim 10 that does not include a superplastizer.

19. A method of producing partially oxidized rubber particles and binding agents, which are suitable for use as concrete components, that comprises heating rubber particles in the presence of oxygen to partially oxidize the rubber particles, which comprise polymers that are cross-linked by organic sulfur compounds, such that the organic sulfur compounds on the surface of the particles are converted into functional groups that are selected from the group consisting of the sulfoxides (R—SO—R), sulfones (R—SO$_2$—R), sulfur trioxides (R—SO$_3$) and mixtures thereof, wherein R represents hydrocarbons in the polymers of the rubber particles, and to form a gas condensate that serves a binding agent for the concrete.

20. The method of claim 19 comprising the steps of:
   (a) heating the rubber particles in a mixture of oxygen and an inert gas to a temperature and for a sufficient length of time to partially oxidize the rubber particles and generate a gaseous by-product; and
   (b) cooling the oxidized rubber particles and gaseous by-product; and (c) recovering the partially oxidized rubber particles and the gas condensate.

21. The method of claim 19 comprising the steps of:
(a) introducing a feed containing crumb rubber particles into an upper portion of a continuous reactor at or near the top at a rate sufficient to establish a desired residence time within the reactor;
(b) preheating a gas mixture of air and an inert gas to a temperature sufficient to initiate and maintain partial oxidation of the rubber particles;
(c) introducing the preheated gas mixture into a lower portion of the reactor;
(d) withdrawing partially oxidized rubber particles from the reactor; and
(e) collecting the gas condensate from an overhead cooler of the reactor.

22. The method of claim 19 wherein the rubber particles are recovered from waste tires, mechanically grounded and screened into irregular particles with desirable sizes in the range of 100 to 1,000 μm.

23. The method of claim 19 wherein the size of the rubber particles ranges from 300 to 600μm.

24. The method of claim 19 comprising heating the rubber particles in a mixture of air and nitrogen that has a volume ratio of air to nitrogen (A/N) in the range of 5/1 to 1/7.

25. The method of claim 24 wherein the A/N is in the range of 1/2 to 1/5.

26. The method of claim 19 comprising heating the rubber particles to a temperature in the ranges from 100 to 500° C.

27. The method of claim 26 wherein the temperature ranges from 200 to 300° C.

28. The method of claim 19 comprising heating the rubber particles for 30 minutes to 3 hours.

29. The method of claim 28 comprising heating the rubber particles for 45 minutes to 2 hours.

30. The method of claim 19 wherein the gas condensate comprises a water-soluble component and a water-insoluble component.

31. The method of claim 19 wherein partial oxidation occurs in the presence of an oxidizing agent that consists essentially of oxygen gas.

32. The method of claim 19 further comprising the step of recovering the partially oxidized rubber particles and the gas condensate.

33. The method of claim 19 wherein the bonding agent contains a functional group that is selected from the group consisting of sulfoxides, sulfones, sulfur trioxides and mixtures thereof.

* * * * *